United States Patent

Massman et al.

[11] Patent Number: 6,049,881
[45] Date of Patent: Apr. 11, 2000

[54] POWER ADAPTER FOR POWERING A REMOTE DEVICE THROUGH A COMPUTER DATA PORT

[75] Inventors: Lloyd H. Massman, Raleigh; William W. Plyler, Charlotte, both of N.C.

[73] Assignee: International Business Machines Corporation, Armonk, N.Y.

[21] Appl. No.: 09/075,357

[22] Filed: May 8, 1998

[51] Int. Cl.⁷ .................................................... G06F 1/18
[52] U.S. Cl. .......................... 713/300; 710/129; 710/62; 363/13; 365/226
[58] Field of Search .................................. 713/300, 310, 713/330; 307/2–6, 45; 710/129, 62; 363/13, 34, 50; 365/226

[56] References Cited

U.S. PATENT DOCUMENTS

| | | | |
|---|---|---|---|
| 5,528,667 | 6/1996 | Steffensen et al. | 379/58 |
| 5,619,395 | 4/1997 | Mcbridge | 361/683 |
| 5,771,281 | 6/1998 | Batten, Jr. | 379/93.23 |

*Primary Examiner*—Ario Etienne
*Attorney, Agent, or Firm*—Scully, Scott, Murphy & Presser; Lawrence R. Fraley, Esq.

[57] ABSTRACT

A power adapter for powering a remote device for use with a portable computer. The power adapter has a first plug for connecting to a data port of the portable computer and for sourcing power from the data port. Also provided is a power converter electrically connected to the first plug for regulating the sourced power from the data port and outputting a power requirement to the remote device. Lastly, a second plug electrically connected to the power converter for connection to the remote device and delivery of the outputted power requirement thereto is provided. Also provided is a portable computer system which utilizes the power adapter of the present invention. The portable computer system comprises a portable computer having a data port, a remote device for use with the portable computer, and the power adapter of the present invention for powering the remote device through the data port. In a preferred embodiment of the power adapter, the remote device is a cordless telephone transceiver and the power is sourced from a mouse port of the portable computer.

14 Claims, 4 Drawing Sheets

POWER ADAPTER FOR POWERING A REMOTE DEVICE THROUGH A COMPUTER DATA PORT

BACKGROUND OF THE INVENTION

1. Field of the Invention

The field of art to which this invention relates is a power adapter for powering a remote device through a computer data port. Specifically, this invention relates to an apparatus for powering a cordless telephone connection through the mouse port of a portable computer.

2. Description of the Related Art

In recent years, with the increased emphasis on the use of portable or laptop computers and the need for telephone connections for use therewith, it is very desirable to combine the two. Laptop computers are now available with a cordless telephone connection which uses 900 MHZ cordless telephone technology to allow the portable user to access Internet Service Providers (ISP) and other telephony functions without the use of a telephone cord from the laptop to the telephone wall jack.

The cordless telephone for use with the laptop typically is powered by its own battery. However, the cordless telephone's battery life is typically less than that of the laptop host computer. If the cordless telephone battery becomes discharged prior to the laptop's battery, the telephone connection will be interrupted, resulting in a potential loss of data. Furthermore, users of laptops frequently plug in the laptop to an AC power source. A second power cord for powering the cordless telephone is then necessary which is cumbersome and inconvenient.

The present invention is intended to provide a solution to various prior art deficiencies which include the problems of powering a cordless telephone for use with a laptop computer by its own battery, or alternatively, requiring a second power cord for connection to an AC power source for powering the cordless telephone.

Although this invention is applicable to numerous and various types of computers, it has been found particularly useful in the environment of laptop computers. Likewise, this invention is applicable to numerous and various types of remote devices for use with computers, but has been found particularly useful for use with cordless telephones. Therefore, without limiting the applicability of the invention to "laptop and/or portable" computers and/or a cordless telephone remote device, the invention will be described in such environment.

SUMMARY OF THE INVENTION

Therefore, it is an object of the present invention to provide a power adapter for use with a portable computer for powering a remote device without the need for an additional battery for powering the remote device.

It is yet another object of the present invention to provide a power adapter for use with a portable computer for powering a remote device without the need for an additional power cord connecting to an AC power source for powering the remote device.

Accordingly, a power adapter for powering a remote device for use with a portable computer is provided. The power adapter has a first plug for connecting to a data port of the portable computer and for sourcing power from the mouse port. The power adapter also has a power converter electrically connected to the first plug for regulating the sourced power from the data port and outputting a power requirement to the remote device. Lastly, the power adapter has a second plug electrically connected to the power converter for connection to the remote device and delivery of the outputted power requirement thereto.

Also provided is a portable computer system which utilizes the power adapter of the present invention. The portable computer system comprises a portable computer having a data port where the data port has a source of power, a remote device for use with the portable computer and having a power requirement for its operation, and the power adapter of the present invention for powering the remote device through the data port.

In a preferred embodiment of the present invention, the remote device is a cordless telephone transceiver and the power is sourced from a mouse port of the portable computer.

Other aspects of the present invention include methods for powering a remote device for use with a portable computer.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Figure 1A:
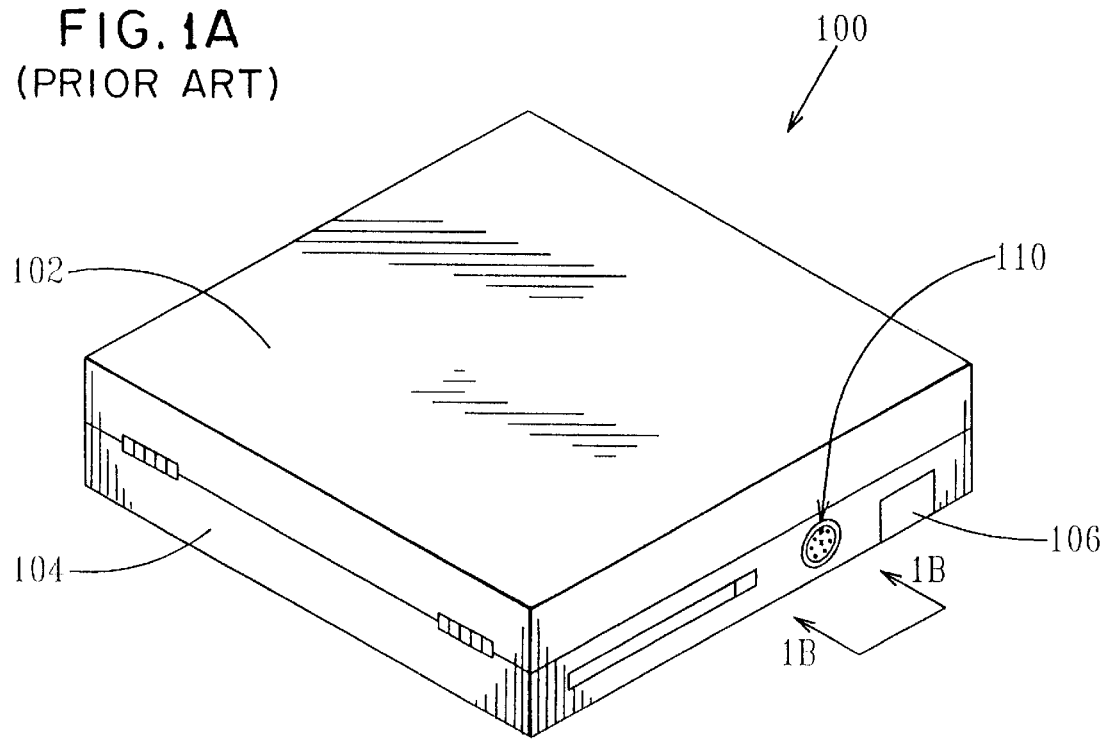
FIG. 1A is an isometric view of a typical portable computer of the prior art.

Referring now to FIG. 1A there is illustrated a typical portable or laptop computer of the prior art, referred to generally by reference numeral 100. The portable computer 100 illustrated in FIG. 1A has the typical clamshell design, namely two halves 102, 104 hinged at one side. One half 104 of the portable computer 100 houses a mouse port 110 for connection to a mouse, keyboard, joystick, trackball, or the like (none of which are shown) for use with the portable computer 100. The laptop is typically powered by either an internal battery 106 or by plugging the laptop into an AC power source via a suitable power cord.

Figure 1B:
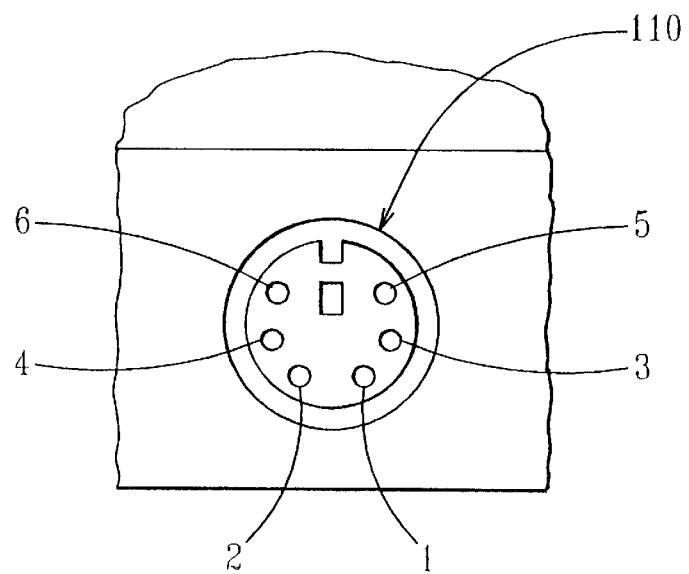
FIG. 1B is a front view of the mouse port of the portable computer of FIG. 1A as viewed along line 1B—1B.

Referring now to FIG. 1B, the mouse port 110 is shown in greater detail. The mouse port is typically a circular female plug having a series of pin connections 1–6 which mate with a corresponding male plug tethered to the mouse, keyboard, etc. by way of a cord. Each pin has a predetermined function such as for data transfer 1, ground 3, clock 5 and power 4. The power supplied at pin 4 is typically +5 V and is generally well regulated. It is well understood to someone in the art that different computer manufacturers have different pin configurations and assignments and therefore the specific pin configuration described is by way of example only, and in no way limits the spirit or scope of the present invention. It should also be understood by someone skilled in the art, that the mouse port is used by way of example only, any data port which has a sourcable power supply can be utilized in the present invention, such as a Universal Serial Port (USB) or the like.

Figure 2A:
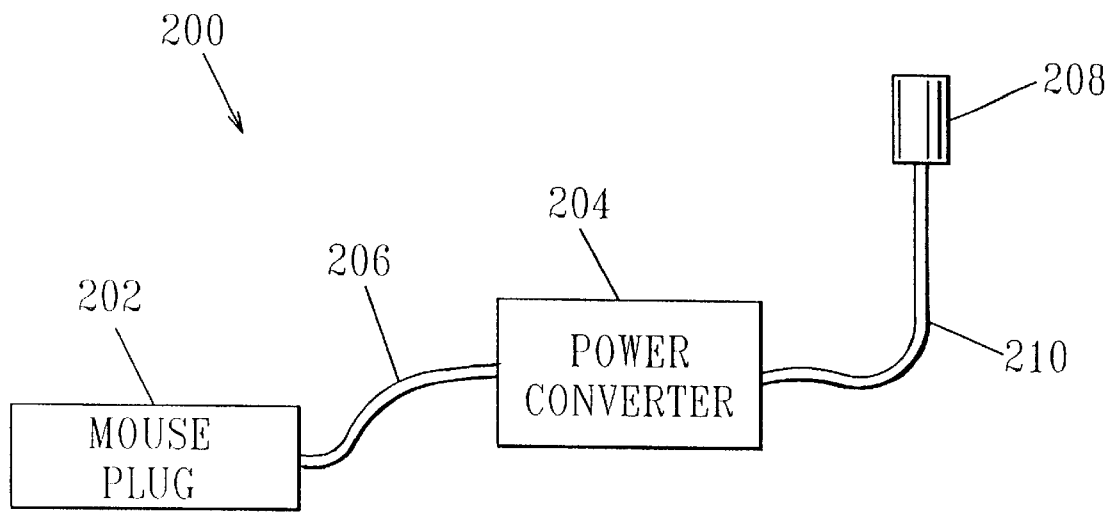
FIG. 2A is a schematic illustration of a first embodiment of the power adapter of the present invention.

Referring now to FIG. 2A, there is illustrated a power adapter of the present invention generally referred to by reference numeral 200. The power adapter 200 is for powering a remote device for use with a portable computer 100 via the portable computer's data port 110. The present invention will be described in terms of the remote device being a cordless telephone transceiver where the power to operate the cordless telephone transceiver is sourced from the data port 110 of the portable computer 100. However, as discussed above, any type of computer and remote device can be used without departing from the scope and spirit of the invention.

The power adapter 200 of FIG. 2A comprises a first plug 202 for connecting to the data port 110 of the portable computer 100 and for sourcing the available power from the data port 110. The first plug 202 is generally a plug which is configured to adapt to the particular data port being used. Preferably, the first plug 202 is a mouse plug configured to adapt to the mouse port 110 of the portable computer 100. A power converter 204 is electrically connected to the first plug 202 via a power cord 206 for regulating the sourced power from the mouse port 110 and outputting a power requirement to a remote device.

The mouse port of the IBM Thinkpad Portable Computer has an available power of +5 V DC. The power coming off the mouse port 110 is generally a well regulated power, but it is not guaranteed so for all different portable laptop manufacturers. Therefore, regulation of the power supply is required. In the specific case where the remote device is an IBM Cordless Computer Connection (CCC) for use with the IBM Thinkpad portable computer, the required power to the CCC is between +3.5 V DC and +4.2 V DC. Therefore the power converter needs to regulate the +5 V DC power from the mouse port 110 to be between +3.5 V DC and +4.2 V DC. Preferably +3.8 V DC is used to power the CCC.

Figure 3A:
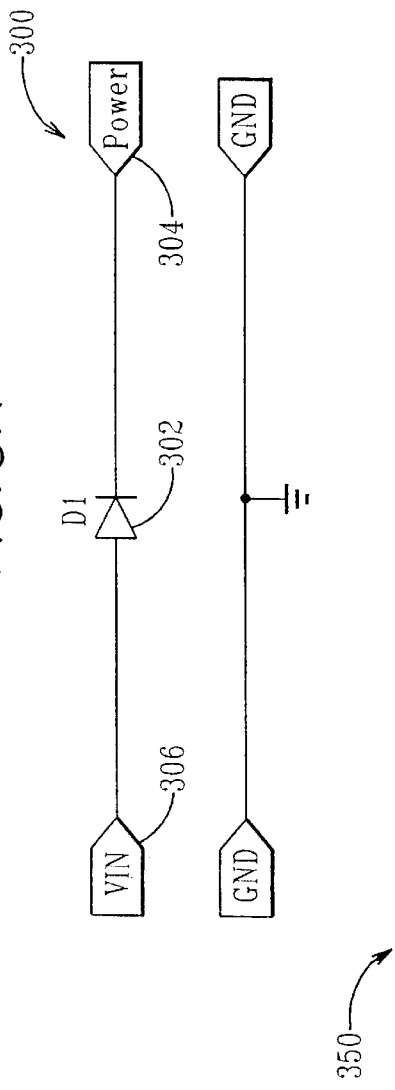
FIG. 3A is an electrical schematic of a first embodiment of the power converter of the power adapter of the present invention.
Figure 3B:
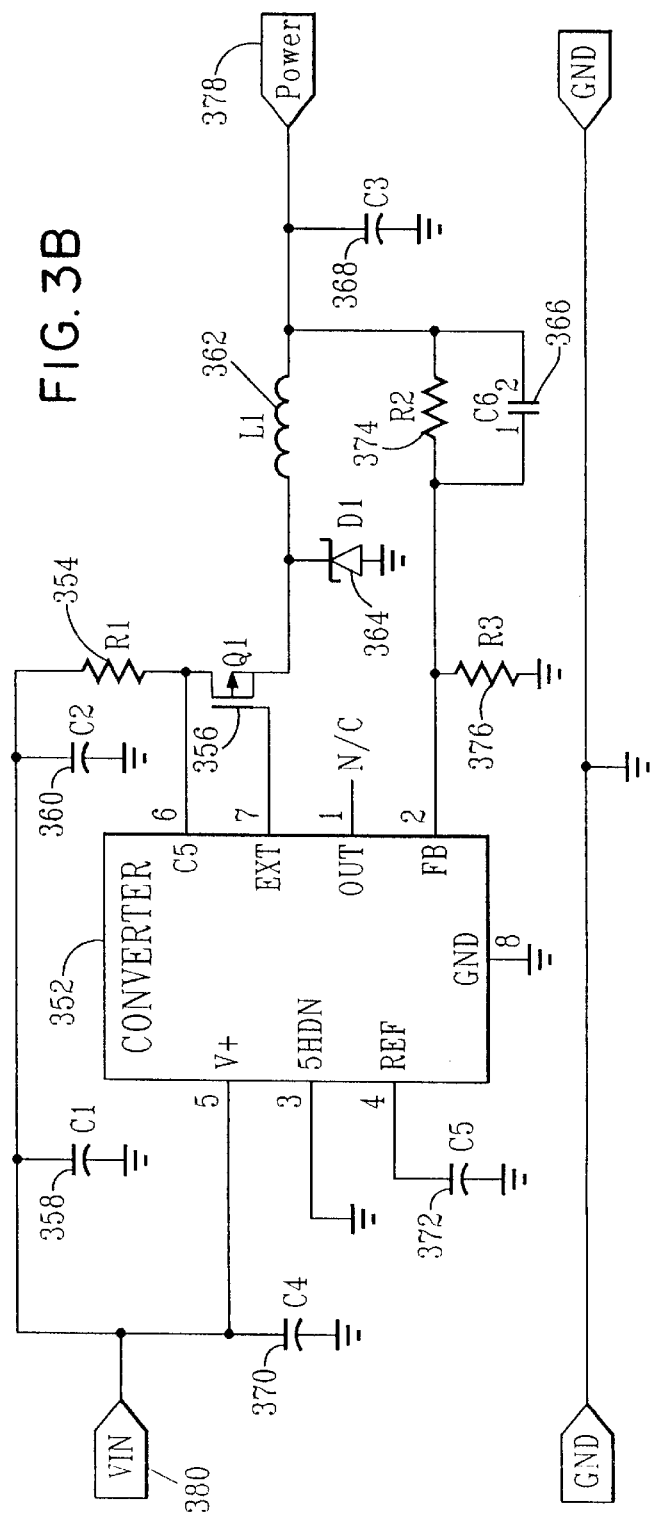
FIG. 3B is an electrical schematic of a second embodiment of the power converter of the power adapter of the present invention.

FIGS. 3A and 3B illustrate two circuits for regulating the power available at the mouse port 110. The circuit of FIG. 3A is referred to generally by reference numeral 300 and relies on the fact that a forward biased diode 302 provides a forward voltage drop of approximately 0.7 volts, thus providing an output voltage 304 of +4.3 V DC from an input voltage 306 of +5 V DC from the mouse port 110. Of course, the regulating capability of circuit 300 depends on the quality and quantity of the power provided by the mouse port 110. Furthermore, all of the power conversion of circuit 300 is dissipated as heat, and since it is a passive design, it has a low conversion efficiency. However, circuit 300 is relatively simple, inexpensive, and reliable.

Another circuit for regulating the power available from the mouse port is shown in FIG. 3B, referred to generally by reference numeral 350. Circuit 350 is based on a Maxim Integrated Products MAX1627 DC-DC converter 352 and was chosen due to its high conversion efficiency (typically measured at about 90%). The switching DC-DC converter 352 is used in circuit 350 to control a switching transistor (Q1) 356 that is used to regulate the voltage that goes out the power connector 378 of the circuit 350. A first resistor (R1) 354 is used to limit the peak switching current and chosen to have a value of 0.04 Ohms in this embodiment. The switching transistor 356 is preferably a MOSFET IRF7416 and is used as the switching element for providing the current and voltage that is presented at the power output 378 of the circuit 350. The switching of the transistor 356 is controlled by the EXT (pin 7) output of the switching DC-DC converter 352. The switching waveform used to control the MOSFET transistor 356 is a function of the CS and the FB inputs (pins 6 and 2 respectively) to the switching DC-DC converter 352.

First and second capacitors (C1 and C2) 358, 360 respectively, are used to filter the input voltage from the VIN 380 input of the circuit 350. In the embodiment shown in FIG. 3B the first and second capacitors 358, 360 are both preferably 68 μf. A first inductor (L1) 362, preferably 22 μH, is used to help filter the spikes out of the switching done by the MOSFET transistor 356 so that the output voltage 378 will have fewer spikes. A Schottky diode (D1) 364, preferably a Motorola MBRS340T3, is also part of the circuit 350 and is also used to reduce the spikes generated by the switching of the MOSFET transistor 356.

A third capacitor (C3) 368, preferably 220 μf, is a part of the output filter used to smooth the output voltage 378 of the circuit 350. A fourth capacitor (C4) 370, preferably 0.47 μf, is used as a power supply bypass capacitor to reduce the high frequency noises that may be introduced into the switching DC-DC converter 352 by the external power supply VIN 380. A fifth capacitor, preferably 0.1 μf is connected to the REF (pin 4) input of the switching DC-DC converter 352 and is used by the switching DC-DC converter 352 internally as a voltage reference to provide noise suppression. A sixth capacitor (C6) 366, preferably 220 pf, used to compensate for excessive stray capacitances on the FB (pin 2) of the MAX1627 352. By adding the sixth capacitor 366 in parallel to a second resistor (R2) 374, increased stability is provided in the circuit 350.

Lastly, circuit 350 has a third resistor (R3) 376. The second and third resistors 374, 376 respectively, are used to program the output voltage 378 of the circuit 350. The value of the output voltage 378 is then determined by the following equation:

$$\text{voltage output} = 1.3 * ((R2+R3)/R2) \tag{1}$$

In order to achieve a desired output voltage from the circuit 350 to input the CCC remote device of the preferred embodiment of approximately 3.9 volts, the following resistor values are required; R2=16 K Ohms, R3=33 K ohms.

Circuit 350 provides a more controlled power to the remote device and has a high conversion efficiency. However, it is more expensive and complicated than circuit 300 and may prove to be less reliable.

It is to be understood by someone skilled in the art that any circuit, now known, or later developed, for regulating the power supplied by the data port 110 can be used in combination with the power adapter of the present invention without departing from the scope and spirit of the present invention.

Referring back to FIG. 2A, the power adapter 200 also has a second plug 208 electrically connected to the power converter via a power cord 210 for connection to the remote device and delivery of the outputted power requirement thereto. The second plug is generally configured to adapt to plug into the power port on the remote device.

Figure 2B:
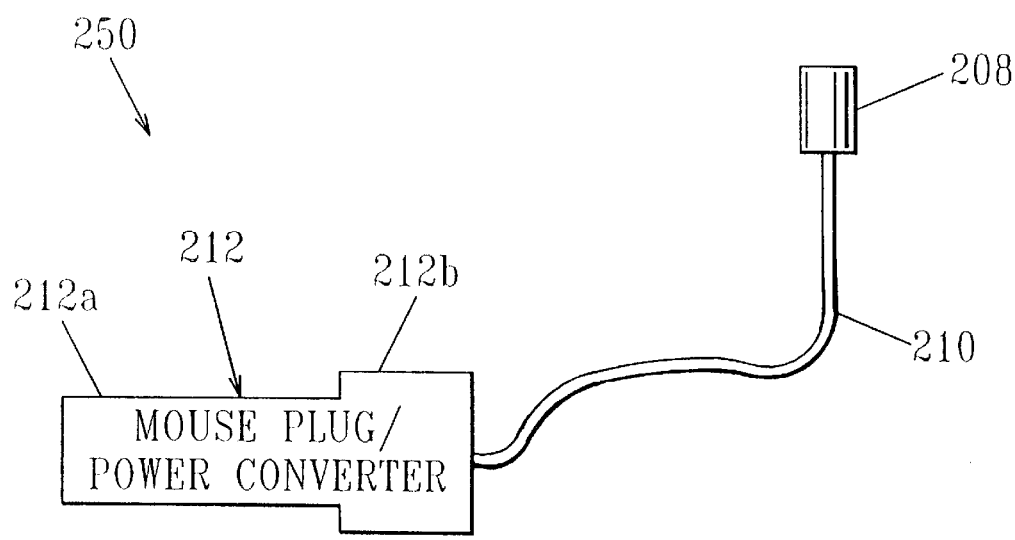
FIG. 2B is a schematic illustration of a second embodiment of the power adapter of the present invention.

Referring now to FIG. 2B, there is illustrated a variation of the power adapter of FIG. 2A, referred to generally by reference numeral 250. In the variation of the power adapter 250 of FIG. 2B the first plug and power convertor 212 are of integral construction. The first plug/power convertor 212, has a first end 212a which is configured to adapt to the data port for which it is being used and a second end 212b which houses a suitable circuit means for regulating the power sourced from the data port 110. The first plug/power convertor 212 is then electrically connected to the second plug 208 via power cord 210 for supplying the remote device with its power requirement.

Figure 4A:
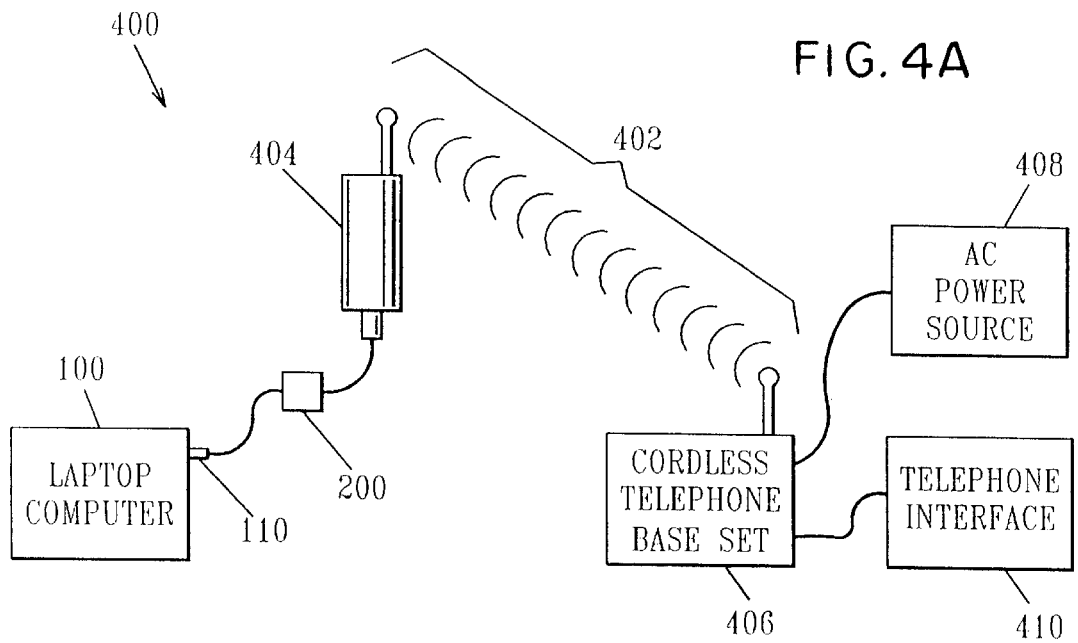
FIG. 4A is a schematic illustration of a first embodiment of a portable computer system utilizing the power adapter of the present invention.

Referring now to FIG. 4A there is illustrated a portable computer system utilizing the power adapter of the present invention, generally referred to by reference numeral 400. By way of example only, the system 400 will be described in connection with an IBM Thinkpad portable computer and a CCC remote device which utilizes the power available at the mouse port of the portable computer. It is to be understood that any computer and remote device for use therewith can be utilized with the power adapter 200 of the present invention without departing from the scope and spirit of the present invention.

The portable computer system 400 comprises a portable computer 100, preferably an IBM Thinkpad. The portable computer 100 having a data port 110, preferably a mouse port. The data port 110 having a source of power, preferably +5 V DC. The portable computer system also has a remote device 402 for use with the portable computer 100 and having a power requirement for its operation. Preferably the remote device is a CCC having a cordless telephone transceiver portion 404 and a remote base set 406 which communicate with each other via cordless telephone technology, preferably via 900 MHZ frequency. The remote base set 406 is connected to an AC power source for powering the base set 406 and a telephone interface for providing a telephone line to the base set 406.

A power adapter 200 of the present invention for powering the remote device 402 through the data port 110 for connecting to the data port 110 of the portable computer 100 and for sourcing power from the data port 110 is also provided. The power adapter 200 electrically connects the available power through the data port to the remote device after regulation of the available power as discussed previously with regard to FIG. 2A. Furthermore, the power adapter 200 of FIG. 2A has been used in the description of the portable computer system 400, it is also to be understood that the power adapter 250 of FIG. 2B can be substituted therewith without departing from the scope or spirit of the present invention.

The portable computer system 400 of FIG. 4A is configured wherein the portable computer 100 is powered by its internal battery 106 of the portable computer 100. Thus, the internal battery 106 powers both the portable computer 100 and the cordless telephone transceiver portion 404 of the remote device 402 via the mouse port 110. The portable computer 100 of FIG. 4A is totally portable, not requiring any power cords for either the computer operation or the telephone connection.

Figure 4B:
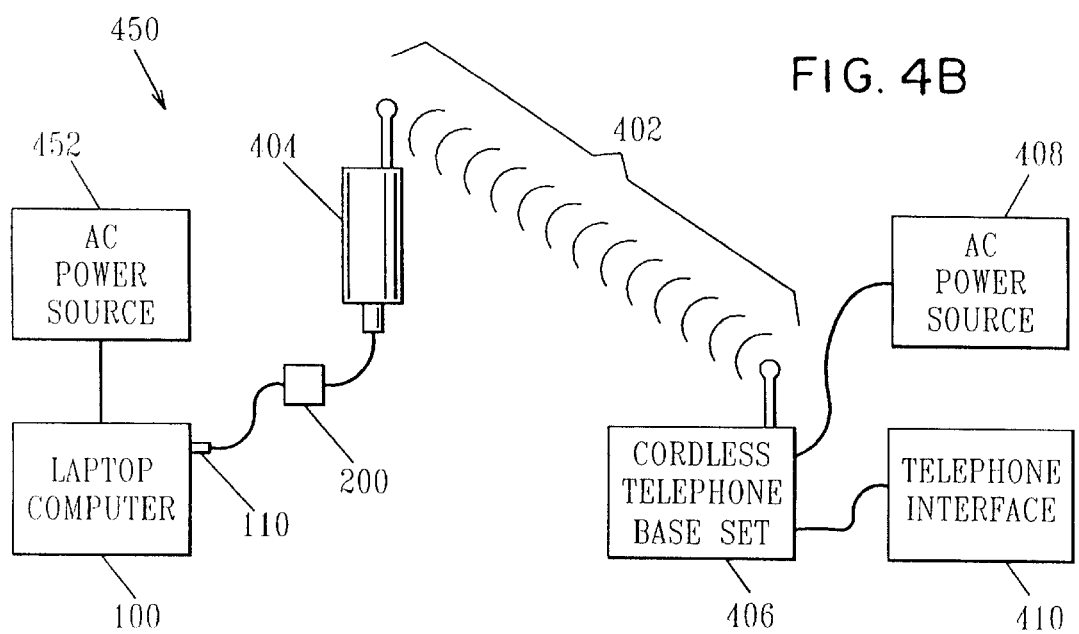
FIG. 4B is a schematic illustration of a second embodiment of a portable computer system utilizing the power adapter of the present invention.

FIG. 4B illustrates an alternative configuration of the portable computer system, referred to generally by reference numeral 450. In this configuration the portable computer 100 is powered by an external AC power source 452 connected to the portable computer 100. Consequently, the mouse port 110 is also supplied with its available power via the external AC power source 452. Thus, the portable computer 100 of the portable computer system 450 illustrated in FIG. 4B is not as portable as the system in FIG. 4A, however it provides for a cordless telephone link and can be used anywhere there is an AC power source.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A power adapter for powering a remote device for use with a portable computer, the power adapter comprising:
   a first plug for connecting to a data port of the portable computer and for sourcing power from the data port;
   a power converter electrically connected to the first plug for regulating the sourced power from the data port and outputting a power requirement to the remote device, and
   a second plug electrically connected to the power converter for connection to the remote device and delivery of the outputted power requirement thereto, wherein said remote device is a cordless telephone transceiver for providing a cordless telephone line connection to the portable computer via a cordless telephone base set connected to a telephone interface.

2. The power adapter of claim 1, wherein the data port is a mouse port.

3. The power adapter of claim 2, wherein the first plug is a mouse plug for connection to the mouse port.

4. The power adapter of claim 1, wherein the second plug is a power plug for connection to the cordless telephone transceiver and providing the power requirement therein.

5. The power adapter of claim 1, wherein the power converter comprises a circuit means, the circuit means having a forward biased diode for converting the sourced power to the power requirement for the remote device.

6. The power adapter of claim 1, wherein the first plug and the power converter are of integral construction.

7. A portable computer system comprising:
   a portable computer having a data port, the data port having a source of power;
   a remote device for use with the portable computer and having a power requirement for its operation, and
   a power adapter for powering the remote device through the data port, the power adapter comprising, a first plug for connecting to the data port of the portable computer and for sourcing power from the data port, a power converter electrically connected to the first plug for regulating the sourced power from the data port and outputting the power requirement to the remote device; a second plug electrically connected to the power converter for connection to the remote device and delivery of the outputted power requirement thereto, wherein said remote device is a cordless telephone transceiver for providing a cordless telephone line connection to the portable computer via a cordless telephone base set connected to a telephone interface.

8. The portable computer system of claim 7, wherein the portable computer is powered by an internal battery of the portable computer and the data port power source is supplied by the internal battery.

9. The portable computer system of claim 7, wherein the portable computer is powered by an external AC power source connected to the portable computer and the data port power source is supplied by the external AC power source.

10. The portable computer system of claim 7, wherein the data port is a mouse port.

11. The portable computer system of claim 10, wherein the first plug is a mouse plug for connection to the mouse port.

12. The portable computer system of claim 7, wherein the second plug is a power plug for connection to the cordless telephone transceiver and providing the power requirement therein.

13. The portable computer system of claim 7, wherein the power converter comprises a circuit means, the circuit means having a forward biased diode for converting the sourced power to the power requirement for the remote device.

14. The portable computer system of claim 7, wherein the first plug and the power converter are of integral construction.

* * * * *